United States Patent [19]

Abramitis et al.

[11] 3,883,342
[45] May 13, 1975

[54] PLANT GROWTH REGULATORS

[75] Inventors: Walter William Abramitis, Downers Grove; John J. Callahan, Park Ridge, both of Ill.

[73] Assignee: Akzona Incorporated, Asheville, N.C.

[22] Filed: Apr. 13, 1973

[21] Appl. No.: 350,854

[52] U.S. Cl. .............. 71/76; 71/95; 260/326.5 FM
[51] Int. Cl. .............................................. A01n 9/22
[58] Field of Search ............ 71/76, 95; 260/326.5 F, 260/326.5 FM

[56] References Cited
UNITED STATES PATENTS

| | | | |
|---|---|---|---|
| 2,865,730 | 12/1958 | Gates et al. | 71/95 |
| 3,240,799 | 3/1966 | Hageman et al. | 71/76 |
| 3,257,414 | 6/1966 | Hageman et al. | 71/76 |
| 3,269,950 | 8/1966 | McCoy et al. | 252/46.4 |
| 3,278,526 | 10/1966 | Louthan et al. | 71/95 |
| 3,316,191 | 4/1967 | Montesano | 260/18 |
| 3,318,677 | 5/1967 | Hageman | 71/76 |
| 3,538,114 | 11/1970 | Himmele et al. | 71/95 |
| 3,632,646 | 1/1972 | Hageman et al. | 71/95 |

FOREIGN PATENTS OR APPLICATIONS 2,040,696   2/1971   Germany .................... 260/326.5

OTHER PUBLICATIONS

Forbes et al., "Ash–Free Antiflocculant N–Aminoalkenyl etc.," (1971), CA 74 No. 101425a.

*Primary Examiner*—Glennon H. Hollrah
*Attorney, Agent, or Firm*—Francis W. Young; Philip M. Pippenger

[57] ABSTRACT

N-substituted long-chain alkenyl succinimides are useful plant growth regulants.

6 Claims, No Drawings

PLANT GROWTH REGULATORS

SUMMARY OF THE INVENTION

This invention is related to plant growth regulators and particularly those which selectively stimulate growth or retard growth to obtain increased yields, depending upon the concentration and time of application of the regulators and upon the particular species of plants being treated.

BACKGROUND OF THE INVENTION

Various derivatives of succinic acid have been proposed as plant growth regulants and herbicides. The proposed derivatives include succinic acid (U.S. Pat. No. 3,399,990) (as a herbicide), decenyl-N, N-dimethyl-succinic acid (Chem. Abst. Vol. 67, page 99099g), succinamides (U.S. Pat. No. 3,632,646), succinamates (Canadian Pat. No. 861,554), N-substituted succinimides (U.S. Pat. No. 2,992,223) (a herbicide), N-phenyl-substituted succinimides (U.S. Pat. No. 3,538,114) (as a herbicide) and N-dimethylaminodecenyl succinimide (U.S. Pat. No. 3,578,679) (frost protection). In Example III of Canadian Pat. No. 861,554, data was presented indicating lack of any growth regulating effect of N,N-dimethyl beta-dodecenyl succinamic acid on flax seedlings. Other related prior art includes U.S. Pat. No.'s 2,865,730 and 3,240,799.

DESCRIPTION OF THE INVENTION

More particularly, the invention relates to the discovery that certain N-substituted long-chain alkenyl succinimides are useful in stimulating plant growth and/or obtaining increased yields. It is surprisingly found that growth can be stimulated or inhibited, i.e. dwarfed, depending upon the concentration of growth regulator applied and that the same regulator may have different effects upon different species. As a result of dwarfing, increased yields are obtained and furthermore, cultivation and harvesting of crops particularly by mechanical means is made easier.

The growth regulators of the instant invention can be applied to the seeds by soaking them in the growth regulator, to the soil or to the plant foilage in various stages.

I have found that certain alkenyl-substituted succinimides are effective in stimulating the growth of certain plant crops and inhibiting growth of the same crops depending upon the concentration of growth regulator used. In certain cases, growth is stimulated by application of the growth regulator in concentrations less than 500 parts per million (ppm.) and are inhibited by concentrations of 500 parts per million or greater.

Furthermore, the succinimides of the present invention may also be applied as the reaction product of an N-alkyl amine and an alkenyl succinic acid, for example, N-2-undecylamine and dodecenyl succinic acid. The reaction products of the latter have been analyzed and found to contain the following four compounds: dodecenyl succinic acid; 2-undecylammonium-N-2 undecylododecenyl succinamate; N-2-undecylododecenyl succinimide and bis-(2-undecylammonium) dodecenyl succinate.

When spraying foilage, a surfactant was used to aid in emulsification of the regulant and increase absorption by the plants. Best results were obtained with equal volumes of plant growth regulator and surfactant although as little as 0.1 percent by weight of surfactant to growth regulator can be used. The particular surfactant is not critical and may be selected from well-known commercially available materials such as Armotan PML-20 [an ethoxylated (20 moles ethyleneoxide) coconut fatty acid ester of sorbitan marketed by Armak Company] or X-77 (a proprietary mixture of surfactants marketed by Colloidal Products Inc.).

The compounds of the invention may be prepared by the reaction above described in the following manner:

Mix stoichiometric amounts of N-2-undecylamine and dodecenyl succinic acid in a beaker in a nitrogen atmosphere. The mixture is heated to 120° C and agitated for 4 to 8 hours.

The compounds may also be prepared from alkenyl succinic anhydrides as follows:

N-(undecyl) — dodecenylsuccinimide was prepared by adding 8.56 g (0.05 mole) of N-undecylamine to 13.83 g (0.05 mole) of dodecenylsuccinic anhydride in 100 ml of xylene in a round bottom flask with attached Dean-Stark trap and condenser. The mixture was heated to the boiling point and held there for 36 hours. After removal of the solvent, 21.9 of an amber-colored liquid was obtained. The liquid was washed with several portions of 5% aqueous hydrochloric acid and 5% sodium bicarbonate solution. Wet analysis indicated that no amine was present but that 0.149 meq. of carboxyl/g was present. The liquid was dissolved in a mixture of isopropanol and water and passed through an Amberlit IRA 400 anion exchanger. 2.35 g of liquid gave 1.6 g of product which contained no carboxyl and no amine and which showed a strong imide carbonyl absorption band in its infrared spectrum at $5.85\mu$.

Exemplary compounds falling within the invention include: N-1-undecylododecenyl succinimide; N-2-undecyl dodecenyl succinimide; N-(1-undecyl)-2,3-dimethyl succinimide; N-(1-undecyl)-2,2-dimethyl succinimide; N-(2-undecyl)-2,2-dimethyl succinimide; brominated N-(1-undecyl)-dodecenylsuccinimide; N-(1-undecyl) octenyl succinimide; N-(1-undecyl) decenyl succinimide and N-(1-undecyl) tetradecenyl succinimide, and have the following general structure:

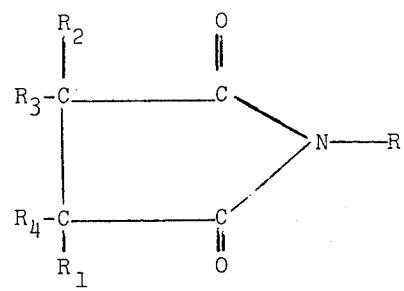

wherein R is alkyl or alkenyl having from 8 to 22 carbon atoms; $R_1$, $R_2$ and $R_3$ are H or $CH_3$, and $R_4$ is alkyl or alkenyl having from 8 to 22 carbon atoms or H, if two of R, $R_2$ or $R_3$ are methyl.

The invention is further illustrated by the following examples.

EXAMPLE I

Two species of beans in the two-leaf stage and emerging peas 1.5 inches in height were sprayed to runoff with N-(2-undecyl)-dodecenyl succinimide at concentrations 1,500 parts per million (ppm.) and 150 ppm. The height of the plants was measured two days after spraying and again 13 days after spraying. The difference in height increase from the control is recorded in the last column of Table I below wherein a negative number indicates dwarfing.

TABLE I

| Plant Species | Conc. (ppm) | Ht. 2 days after spraying | Ht. 13 days after spraying | Increase 11 days | Difference from control |
|---|---|---|---|---|---|
| Pinto Beans | 1500 | 2.5 in. | in. | 1.0 in. | −0.25 in. |
| Pinto Beans | 150 | 2.5 " | 3.5 " | 1.0 " | −0.25 " |
| Pinto Beans (control) | 0 | 2.5 " | 3.75" | 1.25" | — |
| Green Beans | 1500 | 7.0 " | 8.25" | 1.25" | −1.50 " |
| Green Beans | 150 | 5.25" | 6.5 " | 1.25" | −1.50 " |
| Green Beans (control) | 0 | 4.5 " | 7.25" | 2.75" | — |
| Peas | 1500 | 3.75" | 10.5 " | 6.25" | −2.25 " |
| Peas | 150 | 4.0 " | 12.0 " | 8.00" | −0.50 " |
| Peas (control) | 0 | 3.5 " | 12.0 " | 8.50" | — |

EXAMPLE II

Peppers at the seedling stage, snapdragons at the seedling stage and petunias at the pre-bud or seedling stage were sprayed to runoff with the same regulant used in Example I at a concentration of 2000 ppm.

The increase in growth during the nine days following spraying was recorded and compared to control plants having no treatment. The treated pepper plants averaged 2 inches of new growth during this period while the control plants averaged 3.75 inches of new growth. Growth was retarded by 1.75 inches by the application of N-(2-undecyl) dodecenyl succinimide to pepper plants. Similar results were obtained by treatment of the other species as listed below in Table II.

TABLE II

| Plant Species | Conc. (ppm) | New growth during 9 days after spraying | Difference from Control |
|---|---|---|---|
| Pepper | 2000 | 2.00 in. | −1.75 in. |
| Pepper (control) | 0 | 3.75 | — |
| Snapdragons | 2000 | 4.62 | −0.13 |
| Snapdragons | 0 | 4.75 | — |
| Petunias | 2000 | 3.88 | −0.74 |
| Petunias (control) | 0 | 4.62 | — |

EXAMPLE III

N-(1-nonyl) dodecenyl succinimide was applied in the same manner as Example II to peppers, petunias and Michigan Navy White Beans. Results are shown in Table III.

TABLE III

| Plant Species | Conc.(ppm) | New growth during 9 days after spraying | Difference from Control |
|---|---|---|---|
| Pepper | 2000 | 2.12 in. | −1.63 in. |
| Pepper (control) | 0 | 3.75 | — |
| Petunias | 2000 | 3.62 | −1.00 |
| Petunias (control) | 0 | 4.62 | — |
| Michigan Navy Beans | 2000 | 5.25 | −0.25 |
| Navy Beans (control) | 0 | 5.50 | — |

EXAMPLE IV

N-(1-undecyl) dodecenyl succinimide was applied in the same matter as Example II to peppers, petunias and Michigan Navy White Beans. Results are shown in Table IV.

TABLE IV

| Plant Species | Conc.(ppm) | New growth during 9 days after spraying | Difference from Control |
|---|---|---|---|
| Pepper | 2000 | 1.88 in. | −1.87 in. |
| Pepper (control) | 0 | 3.75 | — |
| Petunias | 2000 | 4.50 | −0.12 |
| Petunias (control) | 0 | 4.62 | — |
| | | New growth during 7 days after spraying | |
| Michigan Navy White Beans | 2000 | 2.88 | −2.62 |
| White Beans (control) | 0 | 5.50 | — |

EXAMPLE V

N-(1-undecyl)-2,2-dimethyl succinimide was applied in the same manner as Example II to peppers, snapdragons, petunias and Michigan Navy White Beans. Results are shown in Table V. On peppers, petunias and Michigan Navy White Beans, the growth regulant of this example retarded growth while growth was stimulated when the same regulant was applied to snapdragon.

TABLE V

| Plant Species | Conc.(ppm) | New Growth 9 days after spraying | Difference from Control |
|---|---|---|---|
| Peppers | 2000 | 1.88 in. | −1.87 in. |
| Peppers (control) | 0 | 3.75 | — |
| Snapdragons | 2000 | 5.25 | +0.50 |
| Snapdragons (control) | 0 | 4.75 | — |
| Petunias | 2000 | 1.00 | −3.63 |
| Petunias (control) | 0 | 4.62 | — |
| Michigan Navy White Beans | 2000 | 3.50 | −2.00 |
| White Beans (control) | 0 | 5.50 | — |

EXAMPLE VI

N-(1-undecyl)-2,3-dimethyl succinimide was applied in the same manner as Example II to peppers, snapdragons, petunias and Michigan Navy White Beans. Results are shown in Table VI.

TABLE VI

| Plant Species | Conc.(ppm) | New Growth during 9 days after spraying | Difference from Control |
|---|---|---|---|
| Peppers | 2000 | 1.62 in. | −2.13 |
| Peppers (control) | 0 | 3.75 | — |
| Snapdragons | 2000 | 4.00 | −0.75 |
| Snapdragons (control) | 0 | 4.75 | — |
| Petunias | 2000 | 1.00 | −3.62 |
| Petunias (control) | 0 | 4.62 | — |
| Michigan Navy White Beans | 2000 | 1.25 | −4.25 |
| White Beans (control) | 0 | 5.50 | — |

EXAMPLE VII

When used on tomatoes in the same manner as in the previous Examples, N-(2-undecyl) dodecenyl succinimide resulted in stimulation of growth. Nine days after treatment new growth of 2.38 inches was recorded compared with 1.94 inches for the control. Other growth regulators of the invention also showed stimulating effects on tomatoes as follows:

TABLE VII

| Chemical | Tomatoes Conc.(ppm) | New Growth during 9 days after spraying | Difference from Control |
|---|---|---|---|
| N-(2-undecyl)dodecenyl succinimide (see Example II) | 2000 | 2.38 in. | +0.44 in. |
| N-(1-nonyl) dodecenyl succinimide (see Example III) | 2000 | 2.62 | +0.68 |
| N-(1-undecyl) dodecenyl succinimide (see Example IV) | 2000 | 4.00 | +2.06 |
| N-(1-undecyl) 2,2-dimethyl succinimide (see Example V) | 2000 | 3.12 | +1.18 |
| N-(1-undecyl) 2,3-dimethyl succinimide (see Example VI) | 2000 | 2.50 | +0.56 |
| Control, no treatment | 0 | 1.94 | — |

EXAMPLE VIII

Other succinimides of the invention were applied to navy beans growing in the laboratory in the same manner as the previous examples and the growth in inches recorded after 14 days. The results of treatment with spray concentrations at 200 ppm, 500 ppm and 1,000 ppm are recorded in Table VIII:

TABLE VIII

| Treatment | ppm | 14 day growth (in.) | Difference from Control (in.) |
|---|---|---|---|
| Control | 200 | 21.13 | — |
|  | 500 | 21.13 | — |
|  | 1,000 | 15.12 | — |
| N-(1-undecyl)-octenyl succinimide | 200 | 22.13 | 1.00 |
|  | 500 | 34.62 | 13.49 |
|  | 1,000 | 16.50 | 1.38 |
| N-(1-undecyl)-nonenyl succinimide | 200 | 19.63 | −1.50 |
|  | 500 | 22.13 | 1.00 |
|  | 1,000 | 21.75 | 6.63 |
| N-(1-undecyl)-decenyl succinimide | 200 | 20.50 | −0.63 |
|  | 500 | 23.13 | 2.00 |
|  | 1,000 | 19.62 | 4.50 |
| N-(1-undecyl)-dodecenyl succinimide | 200 | 15.62 | −5.51 |
|  | 500 | 23.50 | 2.32 |
|  | 1,000 | 15.00 | −0.12 |
| N-(2-undecyl)-dodecenyl succinimide | 200 | 22.26 | 1.13 |
|  | 500 | 21.26 | 0.13 |
|  | 1,000 | 17.62 | 2.50 |
| N-(1-nonyl) dodecenyl succinimide | 200 | 17.00 | −4.13 |
|  | 500 | 19.50 | −1.63 |
|  | 1,000 | 18.50 | 3.38 |
| N-(1-undecyl) tetradecenyl succinimide | 200 | 17.00 | −4.13 |
|  | 500 | 19.50 | −1.60 |
|  | 1,000 | 18.50 | 3.38 |
| N-(1-undecyl)-2,2-dimethyl succinimide | 200 | 15.62 | −5.51 |
|  | 500 | 19.62 | −1.51 |
|  | 1,000 | 16.00 | 0.88 |
| N-(1-undecyl)- | | | |

TABLE VIII-Continued

| Treatment | ppm. | 14 day growth (in.) | Difference from Control (in.) |
| --- | --- | --- | --- |
| 2,3-dimethyl succinimide | | | |
| | 200 | 15.38 | −5.75 |
| | 500 | 18.63 | −2.50 |
| | 1,000 | 9.38 | −5.74 |

EXAMPLE IX

A reaction product of N-2-undecylamine and dodecenyl succinic acid was prepared by mixing stoichiometric amounts of each in a beaker in a nitrogen atmosphere and heated to 120°C with agitation for 4 to 8 hours. Analysis of the product showed the following percentages of solids (total 28.132 percent):

| | |
| --- | --- |
| Dodecenyl succinic acid | 0.342 % |
| 2-undecylammonium - N-2 undecyl dodecenyl succinatate | 7.8 |
| N-(2-undecyl) dodecenyl succinimide | 1.64 |
| Bis- (2-undecylammonium) - dodecenyl succinate | 18.35 |
| TOTAL | 28.132 % |

The reaction product (both actual and reconstituted) was tested on a large variety of crops and caused increased growth in some instances and dwarfing, larger leaves, more flowers and better seeds and fruit yield in others. For example, alfalfa seed production was improved by 51.6 percent over the control when sprayed to runoff at 10 percent bloom stage with 2000 ppm. of the reaction product referred to in this example. Increased seed yield over the control was also obtained when the reaction product was applied at the same rate at the 25 percent bloom stage, in two separate applications at the 10 and 25 percent bloom stage and in a single application at a rate of 4000 ppm. at the 25 percent bloom stage. The results are as follows:

TABLE IX

| Concentration (ppm) | Growth Stage | Yield | % Increase Over Control |
| --- | --- | --- | --- |
| 2000 | 10 % bloom | 1072.0 | 51.6 |
| 2000 | 25 " | 934.0 | 32.0 |
| 4000 | 2000 at 10 " | 973.0 | 37.6 |
| | 2000 at 25 " | | |
| 4000 | 10 | 914.0 | 29.4 |
| 0(control) | — | 707.3 | — |

In a field test on Alberta wheat, the reconstituted reaction product applied at a rate of one quart per acre, yield was increased by 123 pounds per acre or 8 percent. The reaction product sprayed on greenhouse rice at a rate of 1500 ppm. showed significant improvement in yield at low nitrogen level treated plants, although no improvement was observed at medium or high levels of nitrogen treated plants.

EXAMPLE X

In greenhouse tests, Inia wheat in the panicle stage was sprayed to runoff with N-(2-undecyl) dodecenyl succinimide at 1500 ppm. The total number of seed heads recorded was 63 compared to 49 for control plants.

I claim:

1. A method for increasing or decreasing plant growth comprising applying to the locus of a plant an effective amount of a regulant of the formula:

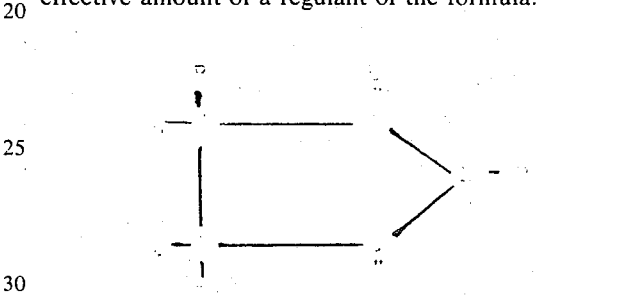

in which

R is alkyl having 8 to 22 carbon atoms;

$R_1$ is selected from the group consisting of hydrogen and alkenyl having 8 to 22 carbon atoms;

$R_2$, $R_3$ and $R_4$ are selected from the group consisting of hydrogen, methyl, and alkenyl having 8 to 22 carbon atoms:

and when $R_1$ is alkenyl, $R_2$, $R_3$ and $R_4$ are hydrogen.

2. The method of claim 1 wherein the regulant is N-(2-undecyl)-dodecenyl succinimide.

3. The method of claim 1 wherein the regulant is N-(1-nonyl) dodecenyl succinimide.

4. The method of claim 1 wherein the regulant is N-(1-undecyl)-dodecenyl succinimide.

5. The method of claim 1 wherein the regulant is N-(1-undecenyl) 2,2-dimethyl succinimide.

6. The method of claim 1 wherein the regulant is N-(1-undecenyl)-2,3-dimethyl succinimide.

* * * * *